(12) United States Patent
Boland et al.

(10) Patent No.: US 8,958,776 B2
(45) Date of Patent: Feb. 17, 2015

(54) APPARATUS, AND ASSOCIATED METHOD, FOR ASSIGNING POLICY SETTINGS TO A MOBILE STATION

(75) Inventors: Michele Bethany Boland, Seattle, WA (US); David Macklem, Mississauga (CA); Keith Alwyn Watson, Mississauga (CA); Kenneth Cyril Schneider, Waterloo (CA); Peter L. Mitchelmore, Elk Grove, CA (US); Jeffrey John Holleran, Viera, FL (US)

(73) Assignee: BlackBerry Limited, Waterloo (CA)

( * ) Notice: Subject to any disclaimer, the term of this patent is extended or adjusted under 35 U.S.C. 154(b) by 733 days.

(21) Appl. No.: 12/766,876

(22) Filed: Apr. 24, 2010

(65) Prior Publication Data
US 2011/0263237 A1     Oct. 27, 2011

(51) Int. Cl.
*H04W 4/00* (2009.01)
(52) U.S. Cl.
USPC ........ 455/414.1; 455/518; 455/519; 709/205; 705/319
(58) Field of Classification Search
CPC ............ H04W 4/00; H04W 4/06; H04W 4/08
USPC ........... 455/414.1, 418, 419, 420, 414.2, 518, 455/519; 709/203, 217–219, 205; 705/319
See application file for complete search history.

(56) References Cited

U.S. PATENT DOCUMENTS

| 8,244,841 B2* | 8/2012 | Shaji et al. ................. 709/223 |
| 2004/0153875 A1* | 8/2004 | Amyot et al. ................. 714/47 |
| 2005/0089054 A1* | 4/2005 | Ciancaglini et al. .......... 370/412 |
| 2008/0132210 A1* | 6/2008 | Korneluk et al. .......... 455/414.1 |
| 2009/0034463 A1* | 2/2009 | Rao ............................. 370/329 |

FOREIGN PATENT DOCUMENTS

JP     2005/269325     * 9/2005

* cited by examiner

*Primary Examiner* — Allahyar Kasraian
*Assistant Examiner* — Farideh Madani

(57) ABSTRACT

An apparatus, and an associated method, automatically calculates and assigns policy settings to be implemented at mobile stations. Information is collected relating to groups, such as groups within an enterprise, to which users of the mobile stations are members. Policy-setting conflicts between different groups, if the user is a member of more than one group, are reconciled, and the policy settings that are assigned are of reconciled settings.

13 Claims, 3 Drawing Sheets

APPARATUS, AND ASSOCIATED METHOD, FOR ASSIGNING POLICY SETTINGS TO A MOBILE STATION

The present disclosure relates generally to a manner by which to assign policy settings to a mobile station to set its operating policy. More particularly, the present disclosure relates generally to an apparatus, and an associated methodology, by which to assign the policy settings based upon group membership of groups which a user of the mobile station belongs.

When a user of a mobile station is a member of multiple groups, reconciliation of conflicting policies of the different groups is performed, and reconciled policy settings are assigned to the mobile station.

BACKGROUND

Advancements in communication technologies have permitted the introduction and popular usage of mobile communication systems and mobile communication devices operable therein. Such systems and devices provide communication mobility, generally permitting communications to be carried out using a mobile communication device from any place within the coverage area of a network part of the mobile communication system.

While early-generation, mobile communication systems generally provided for voice communications and provided only limited data communication capabilities, successive generations of cellular communication systems, incorporating successive advancements in technology, provide for increasingly data-intensive communication services. For many, mobile communication devices are now used, in large part, for their data communication capabilities, rather than merely for voice communications.

Additionally, advancements in circuit and processing technologies have permitted increased miniaturization of communication, and other electronic, devices. The miniaturization of such devices has permitted the packaging of such devices in a common housing, providing thereby multi-functional devices, capable of performing a plurality of different communication, and other, functions.

For instance, portable, mobile communication devices are commercially available, that, in addition to having capabilities for voice communication over traditional cellular or other carrier networks, also have capabilities for data communication over cellular or other carrier networks, wireless local area network capabilities (e.g., "WIFI"), GPS capabilities, a digital camera, specific software capabilities, such as social networking capabilities, as well as other device capabilities.

Multi-functional, portable mobile communication devices are sometimes used in a business, and other, enterprise. Aspects of the operation of, and control of, the mobile communication devices of the enterprises, are sometimes given to an IT (Information Technology) group of the enterprise. The IT group is encharged, for instance, with ensuring the operability of the mobile communication devices, security of communications with the devices, and attending to any of various other facets of communications with, and use of, the mobile communication devices. Some enterprises are very large, having large numbers of enterprise members to whom portable mobile communication devices are provided.

Policy settings are also assigned to the mobile communication devices. The policy settings set various operating parameters of the mobile communication devices. The operating parameters include parameters that control the operability of various components of the mobile communication devices, including hardware features, software features, applications, and the like. These operating parameters define the operating policy of the mobile communication device. For instance, a policy parameter identifies whether a digital camera component of the mobile communication device is operable. That is to say, the policy parameter is set, e.g., to permit the digital camera component to operate or to prevent digital camera component from operating as well as to define various operability aspects of the digital camera component, if permitted to be operable. WIFI operability, GPS operability, and social network software operability are additional examples of policies that are assigned to control the operability of components of a mobile communication device.

Particularly when large numbers of mobile communication devices are used throughout an enterprise, the assignment of policies to different enterprise members is difficult as the enterprise might want to assign different policies to different enterprise members. While enterprise members are sometimes categorized into enterprise-defined groupings, the enterprise members might be in more than one group. Conventionally, therefore, policy setting assignments to mobile communication devices operated by enterprise members generally are not a function of the members' enterprise-defined groupings.

It is in light of this background information relating to mobile communication devices and their associated policy settings that the significant improvements of the present disclosure have evolved.

DETAILED DESCRIPTION

Figures 1, 2:
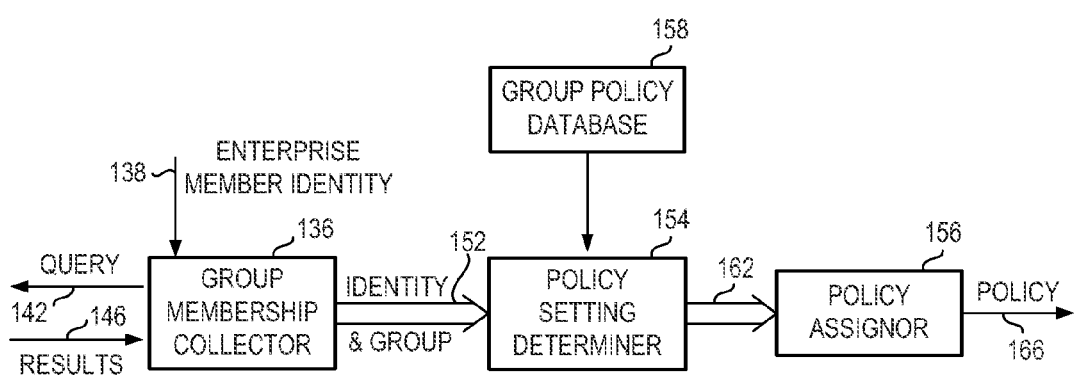
FIG. 1 illustrates a representation of an example directory service used pursuant put operation of an embodiment of the present disclosure.
FIG. 2 illustrates a functional block diagram of the apparatus of an embodiment of the present disclosure.

The present disclosure, accordingly, advantageously provides an apparatus, and an associated method, by which to assign policy settings to a mobile station, which sets the operating policy of the mobile station.

Through operation of an embodiment of the present disclosure, a manner is provided by which to assign the policy settings based upon group membership. Use is made of groups into which an enterprise categorizes enterprise members in the assignment of mobile communication device policies.

In one aspect of the present disclosure, when a user of a mobile station is a member of multiple groups, reconciliation of the conflicting policies of the different groups is performed, and reconciled policy settings are assigned to the mobile station.

In another aspect of the present disclosure, a directory service is provided that identifies users and group attributes of the users. When the users are enterprise personnel, the group attributes associated with each of the enterprise personnel comprise groups into which the enterprise personnel are categorized. Each user may be assigned to any number of groups. The group categorizations are assigned, e.g., by a human resources department of the enterprise. The directory service, howsoever originated and created, is accessible and used to associate group membership information provided by the group attributes associated with the individual ones of the personnel. And, as the entries, or their associated attributes, change, the directory service is updatable to indicate such changes. For example, if an enterprise adds additional personnel, the directory service is updatable to indicate the additional personnel and their associated attributes. Analogously, if personnel leave the enterprise, the directory service is updatable to delete such personnel from the directory service. And, if the group, or groups of which personnel or members change, or the attributes otherwise change, the directory service is updatable to indicate the change in the group or other attribute associated with the personnel.

In another aspect of the present disclosure, the directory service is accessible to collect group membership information relating to the enterprise personnel. The group membership information is collected, for example, pursuant to a query and result procedure. For any member of the enterprise whose mobile station is to be provisioned with policy settings, the directory service is accessed to obtain the group membership information associated with the identified, enterprise member. Collection is, for example, initiated automatically responsive to input of an enterprise member identity.

In another aspect of the present disclosure, the collected information related to the enterprise member and the group membership information identifying the groups to which the associated enterprise member belongs are provided to a policy setting determiner. The policy setting determiner accesses a group policy database to obtain group policy settings associated with the group or groups to which the enterprise member belongs. The determiner functions to determine the policies that should be assigned to the mobile station used by the enterprise member. The determination is a function of the group or groups associated with the enterprise member and the policies of such group or groups. If the enterprise member is associated with a single group, the policy setting determiner determines the policy settings for the mobile station to correspond to the policy settings of the single group of which the enterprise member is associated.

If, conversely, the enterprise member is a member of more than one group, then the policy setting determiner further determines whether the groups associated with the enterprise member have conflicting policy settings, i.e., dissimilar policy settings, and in that case the determiner further functions to reconcile the dissimilarities. Reconciliation involves, for example, selecting a policy setting from one of the more than one groups associated with the enterprise member. Selected policy setting or settings, referred to herein as the correct policy setting or settings. The selected policy settings form, at times, an amalgamation of policy settings selected from amongst the more than one group.

In another aspect of the present disclosure, the group policies of the different groups are hierarchically ranked. That is to say, in one implementation, a ranking is associated with different groups. And, in an alternate implementation, a ranking is associated with individual policy settings of the group. In the event of a conflicting policy setting between groups with which the enterprise member is associated reconciliation is made. The policy setting of a group having a best, e.g., highest, rank is selected over a conflicting policy setting of a lesser-ranked group. Or, in an implementation in which rankings are associated with individual policy settings, the policy setting having a best rank is selected.

In another aspect of the present disclosure, the reconciled policy setting or settings determined by the policy setting determiner is provided to an assignor. The assignor functions to assign the determined policy settings to the mobile station of the enterprise member. Because the policy settings that are assigned are based upon the group or groups with which the enterprise member is associated, with conflicting settings reconciled in a hierarchical manner, correct policy settings are assigned to the mobile station. The process is carried out automatically, if desired, facilitating efficient setting of the policies of the mobile stations.

In these and other aspects, therefore, an apparatus, and an associated method, is provided for facilitating mobile-station assignation of a mobile-station policy setting. A policy setting determiner is adapted to receive group membership information associated with a member identity. The policy setting determiner is configured to determine a correct policy setting. An assignor is configured to make the mobile-station policy assignation of the mobile station policy setting based on determination by the determiner of the correct policy setting.

Turning next to FIG. 1, an example directory service, shown generally at 110, is representative of a directory service formed at an enterprise to identify enterprise personnel and their attributes. The directory service, in the example implementation, is embodied at an enterprise server to which selective access is permitted by appropriate enterprise entities. The directory service is, for example, created using information provided by an enterprise human resources department and installed and maintained by an enterprise Information Technology (IT) department.

The example directory service 110 shown in FIG. 1 includes entries, i.e., objects 114 that identify enterprise members 116. In the example shown in FIG. 1, the enterprise members 116 are members of the enterprise that utilize enterprise-provided, or otherwise enterprise-controlled, mobile stations. Herein, the term "enterprise" may denote a business enterprise, but may also refer to any other organization or collection of users, regardless of form, whose mobile stations are managed or administered as a group. This may include, for non-limiting examples, business organizations, non-profit organizations, government entities, mobile network service providers, e-mail service providers, and the like. N members 116 are listed in the directory service. Each enterprise member 116 has associated attributes, here identifying groups to which the associated members belong. In the example embodiment, an enterprise member is a member of any number of groups. If the member is not a member of any specific group, the member is considered to be part of a default group. Otherwise, and as indicated in the example representation, the attribute associated with each member identifies to which group that the member belongs. Here, N groups, groups 118-1 through 118-N are shown. The third enterprise member 116 (member 3) is shown to be a member of group one 118-1 and group two 118-2. And, the enterprise member 116 is a member of groups 1, 2, and N.

While not separately shown, the directory service includes additional attributes associated with the members 116. The representation shown in FIG. 1 is by way of example only.

The identification of the groups to which the members 116 belong is used pursuant to operation of an embodiment of the present disclosure by which to obtain information of the group memberships associated with the enterprise members. That is to say, the directory service 110 is accessed during operation of an embodiment of the present invention to obtain the information of the groups to which individual ones of the enterprise members belong.

Turning next to FIG. 2, an apparatus 132 of an embodiment of the present disclosure provides for automatic calculation and assignment of mobile policy settings to mobile stations. In the example implementation, the apparatus 132 is operated by an enterprise organization, implemented, for example, at an application mobile device servicing system of the enterprise. The apparatus 132 is functionally represented, implementable in any desired manner, including software implementations, hardware implementations, and combinations thereof.

The apparatus 132 includes a group membership collector 136. The group membership collector operates to collect group membership information associated with enterprise members. The group membership collector is provided with enterprise member identities, here indicated by way of the line 138. The enterprise member identity identifies, by name, code, or otherwise, the enterprise members whose group membership is to be collected and to whose mobile stations that mobile policy settings should be assigned. For non-limiting examples, the group membership collector may receive from a list of member IDs from the directory service 110 (FIG. 1), an administrative or configuration database (not shown) of a mobile device servicing system 194 (see FIG. 3), or the like.

The group membership collector, responsive to a provided enterprise member identity by way of the line 138 accesses an appropriate directory service, such as a directory service analogous to the directory service 110 shown in FIG. 1, to obtain the group membership information. In one implementation, and as illustrated, the group membership collector generates a query for information related to the enterprise member, identified by the enterprise member identity, and the query is used to access the directory service at which the group membership information is indexed together with the associated group members. The query is indicated by the line 142. Responsive to the query, the accessed information is returned to the group membership collector. The responses, i.e., the results of the query, are provided to the group membership collector, here by way of the line 146. The collected information includes the group membership information, which identifies the groups to which the associated member belongs.

Collected information is provided, indicated by way of the line 152, to a policy setting determiner 154. The determiner operates to determine the mobile policy settings for a mobile station allocated to, or otherwise used by, the enterprise member, identified by the enterprise member identity. The policy setting determiner also accesses, or is provided with information stored at, a group policy database 158. The group policy database contains group policies, i.e., the policy settings associated with an enterprise group. The settings are defined at the enterprise or otherwise adopted at the enterprise. The policies define the mobile-station settings that are to be implemented at mobile station used by enterprise members who belong to the associated groups. The group policy database may, for non-limiting example, be implemented as part of an administrative or configuration database (not shown) of a mobile device servicing system 194 (see FIG. 3).

As noted previously, an enterprise member might belong to more than one group. Because the different groups might have different mobile policies, mobile policies of the different groups might contain settings that conflict with one another. The policy setting determiner operates, amongst other things, to resolve the conflicts, that is to say, reconcile the conflicts. The determiner determines whether the enterprise member is associated with more than one group. If the enterprise member is associated with only one group, or no group, there are no conflicting policy settings due to membership in more than one group. The determiner obtains the policies associated with the identified group from the database, and determines that the policies, so-obtained, are to be allocated to the mobile station used by the enterprise member. If the enterprise member is not a member of any group, then a default policy, also, e.g., stored at, and obtained from, the group policy database, is used.

If the enterprise member is associated with more than one group, then the policy setting determiner determines which of the policy settings of the respective groups should be assigned to the mobile station used by such enterprise member. In one example implementation, the groups also include group rankings. Each group has an associated rank that indicates its relative ranking, relative to other groups. When the enterprise member is a member of at least two groups, the calculator further determines whether the groups have conflicting policies. If no policy of the group conflicts, the group policies of the best group are determined to be the policy settings that are to be assigned to the mobile station used by the enterprise member. However, as the policy settings of the groups do not have conflicting policies, the policy settings of another group of other rank can instead be selected, if desired.

If the enterprise member is a member of more than one group and the calculator further determines that at least one policy setting of the respective groups conflict, the policy setting determiner further reconciles the conflicting policy setting. In one example implementation, the determiner selects the policy setting of the conflicting policy settings from the group having the highest rank. In another example implementation, a ranking is associated with individual policy settings within a group. And, the determiner selects the policy setting having a best rank. Policy settings for the enterprise member thereby form an amalgamation in which individual policy settings that conflict are selected on a hierarchical basis.

The apparatus 132 further includes a policy assignor 156 that receives the correct policy settings 162 determined and selected by the policy setting determiner 154. The policy assignor assigns the policy settings to a mobile station used by the associated enterprise member. The policy assigned is indicated on the line 166.

Figure 3:
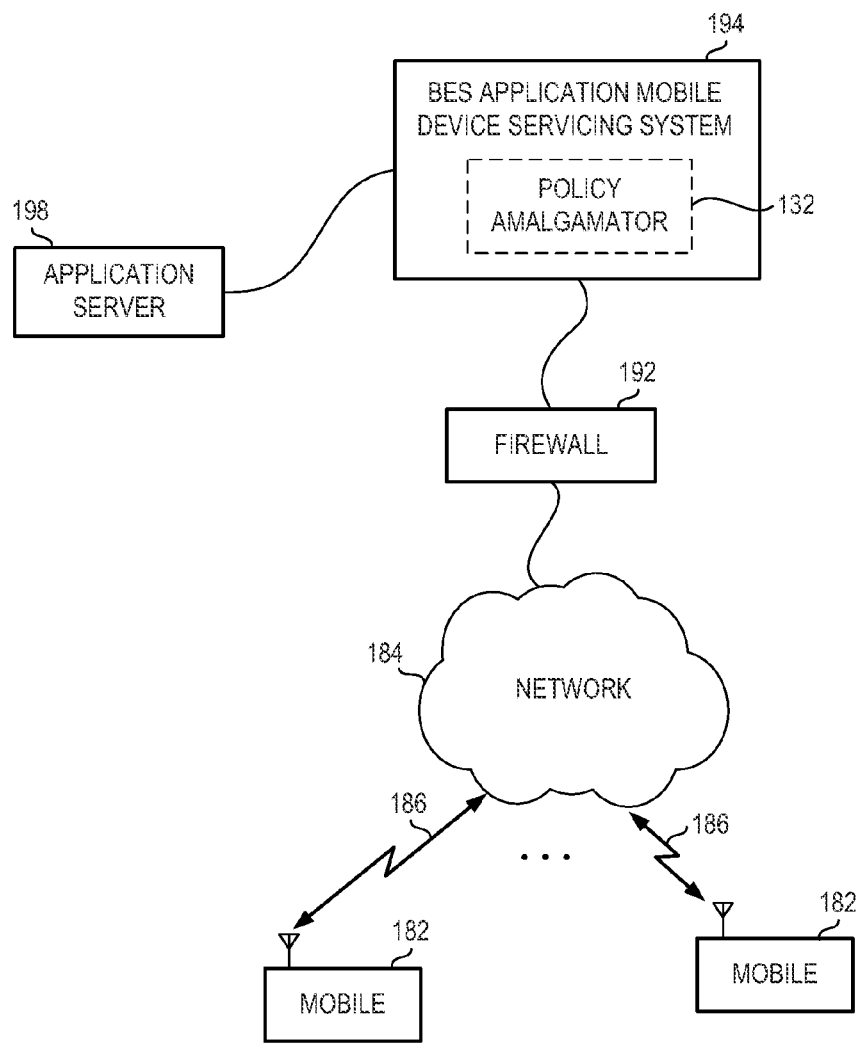
FIG. 3 illustrates a functional block diagram of a mobile communication system in which an embodiment of the present disclosure is operable.

FIG. 3 illustrates a mobile communication system, shown generally at 176, in which the apparatus forming a policy amalgamator 132 forms a portion. The mobile communication system is merely representative of one implementation of an embodiment of the present disclosure. In other implementations, the apparatus 132 is implemented in other communication systems and in other manners.

The mobile communication system 176 includes a plurality of mobile stations 182, each of which is placeable in communication connectivity with a network 184 by way of a radio air interface 186. The communication system also includes enterprise entities positioned behind an optional enterprise firewall 192. Here, the entities include an application mobile device servicing system 194 and an application server 198 placeable in communication connectivity with the system 194. The apparatus 132 is here embodied at the system 194. In one implementation, a directory service, such as the directory service 110 shown in FIG. 1, is embodied at the application server 198. In other implementations, the directory service 110 may be embodied separate from the application server 198, for example, in a general purpose directory facility that provides directory and authentication services for many applications. The directory service 110 may be implemented using any appropriate computing equipment and software, including but not limited to software implementing network information service/yellow page (NIS/YP) or lightweight directory access protocol (LDAP) conventions, Microsoft ACTIVE DIRECTORY software, and the like.

In operation, the apparatus 132 determines and assigns policy settings for the mobile station 182. The assignments are made automatically and as a function of the group or groups to which a user of a mobile station 182 belongs. Policy settings selection is made in the event of conflicting policy settings, which are assigned on a hierarchical basis to form an amalgamation of policy settings. In some embodiments, the assigned policy settings (e.g., 166, FIG. 2) may be transmitted or otherwise delivered or furnished to the mobile station 182 for implementation thereon. In other embodiments, the policy settings may be implemented by mobile device serving system 194. In further embodiments, the policy settings may be implemented by both the mobile station 182 and the mobile device serving system 194, either in cooperation or independently.

Figure 4:
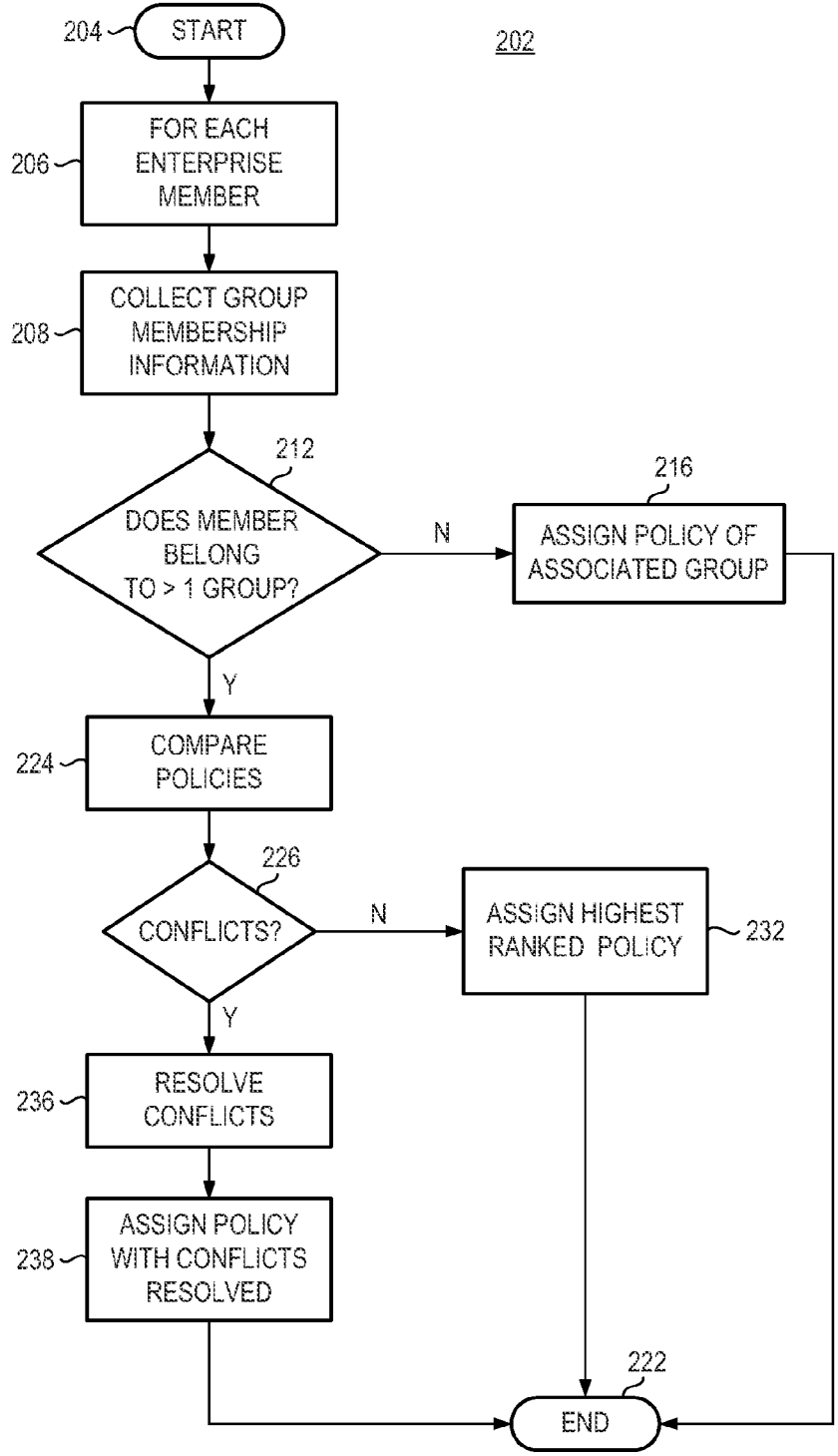
FIG. 4 illustrates a process diagram representative of an example process of an embodiment of the present disclosure.

FIG. 4 illustrates a process, shown generally at 202, representative of the process of operation of an embodiment of the present disclosure. The process selects a policy setting for assignment to a mobile station, such as a mobile station used by a member of an enterprise.

The process starts at the start block 204. Then, and as indicated by the block 206, for each enterprise member, group membership information is collected, indicated by the block 208.

Then, and as indicated by the decision block 212, determination is made as to whether the member belongs to more than one group. If not, the no branch is taken to the block 216, and the policies of the associated group are assigned or that of a default set of policies if the member does not belong to any group. A path extends from the block 216 to the end block 222.

If, conversely, a determination is made at the decision block 212 that the member belongs to more than one group, the yes branch is taken to the block 224, and policies of the groups to which the member belongs are compared. Then, a determination is made, as indicated by the decision block 226, as to whether any conflicting policies are contained in the groups. If not, the no branch is taken to the block 232, and a policy of a highest-ranked group to which to which the member belongs is assigned. A path extends from the block 232 to the end block 222.

If, conversely, a conflict is detected at the decision block 226, the yes branch is taken to the block 236. Conflicts between policy settings of the different groups are resolved. Then, a path is taken to the block 238, and policy settings are assigned, once the conflicts have been resolved.

Because the mobile stations are provided with policy settings are group-dependent but with conflicts between conflicting policy settings of different groups resolved, policy settings can be automatically assigned to mobile stations based upon the group or groups to which users of the mobile stations are members. As a result, it is not necessary for an administrator to manually assign or resolve policies for each individual user or mobile station.

Presently preferred embodiments of the disclosure and many of its improvements and advantages have been described with a degree of particularity. The description is of preferred examples of implementing the disclosure, and the description of examples is not necessarily intended to limit the scope of the disclosure. The scope of the disclosure is defined by the following claims.

What is claimed is:

1. An apparatus for facilitating mobile-station assignation of a mobile-station policy setting for a member identity identifying a member of an enterprise, said apparatus comprising:
a policy setting determiner adapted to receive group membership information associated with said member identity and identifying each group to which the member identity is associated, said policy setting determiner configured to determine whether the member identity is associated with more than one group, and if so, to determine whether the group membership information of the more than one group contains a dissimilar policy setting, said policy setting determiner further configured to determine, a correct policy setting for said member identity such that, when the member identity is associated with more than one group, determining a first-group policy setting conflicts with a second-group policy setting, the correct policy setting is selected on an hierarchical basis and is a function of the rank of groups having dissimilar policy settings; and
an assignor configured to make the mobile-station policy assignation of the mobile-station policy setting for a mobile station associated with said member identity in said enterprise based on determination by said policy setting determiner of the correct policy setting.

2. The apparatus of claim 1 further comprising a group membership collector configured to collect group membership information associated with the member identity.

3. The apparatus of claim 2 wherein the group membership information is maintained at a directory said group membership collector is configured to access the directory.

4. The apparatus of claim 1 wherein said policy setting determiner is further adapted to receive group mobile-station policy information and wherein said policy setting determiner is configured to determine the correct policy setting responsive to the group membership information and the group mobile-station policy information.

5. The apparatus of claim 4 further comprising a group policy database configured to store group mobile-station policy information, said policy setting determiner further configured to access the group policy database and group mobile-station policy information stored thereat.

6. The apparatus of claim 1 wherein said policy setting determiner is further configured to compare ranks of the groups and wherein the setting of the correct policy setting is of the policy setting of the group having a better rank.

7. The apparatus of claim 6 wherein said assignor is configured to make assignation of the mobile station policy setting using the policy setting of the group selected by said policy setting determiner as the correct policy setting.

8. The apparatus of claim 1 wherein a policy setting in each group has an associated rank and wherein the setting of the correct policy setting is a function of the rank of the policy setting in each group.

9. The apparatus of claim 1 wherein said assignor is configured to assign a group policy of a group identified by the group membership information, associated with the member identity, when the group membership information indicates one group to be associated with the member identity.

10. The apparatus of claim 1 wherein said assignor is configured to assign a group policy of a highest-ranking group identified by the group membership information associated with the member identity, when the group membership information indicates more than one group, all having similar policies.

11. A method for facilitating mobile-station assignation of a mobile-station policy setting for a member identity identifying a member of an enterprise, said method comprising:
calculating a correct policy setting using group membership information that indentifies each group associated with said member identity, said calculating comprising determining whether the member identity is associated with more than one group and if so, determining whether group membership information of the more than one group contains a dissimilar policy setting and identifying groups to which the member identity is associated, such that, when the member identity is associated with more than one group, determining a first-group policy setting conflicts with a second-group policy setting, the correct policy setting is calculated on a hierarchical basis and wherein calculation of the correct policy setting is a function of the rank of groups having the dissimilar policy setting; and making the mobile-station policy assignation of the mobile-station policy setting for a mobile station associated with said member identity in said enterprise based on calculation made during said calculating of the correct policy setting.

12. The method of claim 11 wherein the group membership information comprises information identifying each group to which the member identity is associated.

13. The method of claim 12 wherein said calculating further comprises determining whether the member identity is associated with more than one group.

\* \* \* \* \*